United States Patent Office 3,205,061
Patented Sept. 7, 1965

3,205,061
METHOD OF DISPERSING UREA IN
PARAFFIN WAX
Joseph C. Mason, Jr., Wallingford, Pa., assignor to Sun Oil Company, Philadelphia, Pa., a corporation of New Jersey
No Drawing. Filed Feb. 20, 1964, Ser. No. 346,129
6 Claims. (Cl. 71—28)

This invention relates to a method of forming a stable dispersion of urea in molten paraffin wax. The dispersion is stable in that the urea and molten paraffin wax components thereof do not react to form an adduct. This reaction is prevented, and stability thus imparted to the dispersion, by incorporating a small amount of certain types of polyalkyl aromatic hydrocarbons in the paraffin wax. The stable dispersion is useful in that a slow release urea fertilizer can be made therefrom.

Nitrogen, potassium, and phosphorus are essential elements for plant growth and commercially available fertilizers invariably contain one or more of these elements. Examples of those in frequent use at the present time include urea, ammonium nitrate, potassium chloride, sodium nitrate, ptoassium phosphate, monoammonium phosphate, diammonium phosphate, potassium sulfate, calcium cyanamide, potassium nitrate, superphosphate (a mixture of calcium acid phosphate and calcium sulfate), and triple superphosphate (calcium acid phosphate). Urea is a preferred source of nitrogen because it contains a higher percentage of nitrogen than the other nitrogen fertilizer compounds mentioned.

The number of fertilizer compounds applied to the soil at a given time depends mainly upon the soil analysis and the crops to be grown. In some cases only nitrogen is needed, hence only a nitrogen fertilizer is applied. In the majority of cases, however, all three of the essential elements are needed and in such cases the fertilizer actually applied to the soil is a blend of nitrogen fertilizer, a potasssium fertilizer, and a phosphorus fertilizer. Some compounds such as diammonium phosphate contain more than one essential element. A fertilizer containing all three essential elements is conventionally referred to as a complete fertilizer. It is also conventional to state the amount of each essential element in the complete fertilizer by a series of numbers which refer, in order, to the weight percentage of nitrogen (as N), phosphorus (as $P_2O_5$), and potassium (as $K_2O$) in the fertilizer. For example a 20-10-5 fertilizer contains 20% nitrogen, 10% phosphorus, and 5% potassium by weight. Fertilizers lacking an essential element are also described by this system but by conventional terminology they are not complete fertilizers. Thus 10–0–10 fertilizer contains 10% nitrogen, no phosphorus, and 10% potassium. In addition to the above, most conventional fertilizers, whether complete or otherwise, contain some inert material in order to maintain the percentage of the essential elements present in the fertilizer at a relatively low level in an attempt to avoid excessive local concentrations of, say, nitrogen in the soil which may result in "burned" crops.

Unfortunately most of the commercial fertilizers mentioned previously are readily water soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather than benefit. This is often noticed in "burned" lawns or crops.

One method of reducing the rate at which the fertilizer is consumed is to mix the fertilizer and molten wax, i.e., disperse the fertilizer in molten wax, form the dispersion into small particles in a mold and allow the particles to cool below the melting point of wax. The resulting particles are a dispersion of solid fertilizer particles in solid wax. Substantially all the fertilizer particles are surrounded by and encased in wax. They can also be described as a slow release fertilizer. The water resistance of the fertilizer can be varied, by varying the amount of wax in the dispersion, so as to provide the proper rate of release of essential elements for the particular climatic conditions encountered. In areas of relatively heavy rainfall the water resistance of the fertilizer should normally be relatively high and the amount of wax in the dispersion should be relatively high. Conversely, in relatively dry areas the water resistance should be relatively low and the amount of wax in the dispersion should be relatively low.

It was mentioned previously that urea is a preferred source of nitrogen since it contains a relatively high (47%) amount of nitrogen. This feature of urea becomes especially valuable when a slow release fertilizer is prepared in the manner described above. The wax portion of the slow release fertilizer contributes no nitrogen, potassium, or phosphorus. Furthermore, the wax reduces the proportion of actual fertilizer materials in the slow release fertilizer. This being the case it becomes necessary to use fertilizer ingredients having a high content of essential elements. For this reason most slow release fertilizers will contain urea as a source of nitrogen. The actual urea content of the slow release fertilizer will vary rather widely depending upon the particular type of fertilizer. A slow release nitrogen fertilizer will normally contain a major amount of urea, i.e., more than 50%, and a minor amount, i.e., less than 50%, of wax. Usually the amount of urea will be 50–80%, more frequently 50–70%, and the amount of wax will be 15–49%, more frequently 25–49%, the exact amounts depending upon climatic conditions as described above. All percentages and parts herein are by weight.

In the case of a slow release fertilizer containing a plurality of essential elements the total amount of fertilizer ingredients and the amount of wax will still normally be a major amount and a minor amount respectively, usually 50–80%, and 15–49% respectively, more frequently 50–70% and 25–49% respectively, but the actual amount of urea may in some cases be relatively small. For example, a 10–10–10 complete slow release fertilizer might contain the following:

|  | Percent |
|---|---|
| Urea | 21.4 |
| Triple superphosphate | 21.8 |
| Potassium chloride | 16.7 |
| Wax | 40.1 |
|  | 100.0 |

A 5–15–10 complete slow release fertilizer might contain

|  | Percent |
|---|---|
| Urea | 10.7 |
| Triple superphosphate | 32.6 |
| Potassium sulfate | 18.5 |
| Wax | 38.2 |
|  | 100.0 |

In most cases the amount of urea will not be less than 5%. Usually it will be at least 10%, more frequently 20%. Therefore, considering both the case where the urea is the only fertilizer ingredient and the case where urea is one of a plurality of fertilizer ingredients, the amount of urea will usually be 5–80% urea, more frequently 20–70%, and the amount of wax will usually be 15–49%, more frequently 25–49%.

Although several different kinds of waxes can be used to prepare a slow release fertilizer paraffin wax is often preferred because of its generally lower cost. However, when urea is dispersed in molten paraffin wax preparatory to forming slow release fertilizer particles, a serious difficulty is encountered. When the urea and molten paraffin wax are initially mixed nothing unusual occurs. The mixture is fluid, i.e., it takes the shape of its container, and it has the usual appearance and texture of a mixture of a solid and a liquid. Shortly after mixing, however, a white precipitate forms. If the ratio of urea to molten paraffin wax is greater than 1:1 the entire mass becomes a granular solid having about the texture of wet sand. In this case it is difficult to even remove the material from the mixing vessel. The solid precipitate is not merely a physical mixture of wax and urea because when it is heated to 210° F. the wax component thereof, which has a melting point of 129° F., does not melt. Analysis of the precipitate indicates that it contains a substantial amount of a urea-paraffin wax adduct having a composition of about 76% urea-24% paraffin wax. The time required for adduction, i.e., for the formation of the precipitate, varies somewhat but appears to depend mainly upon urea particle size. When commercial crystal urea, which has a particle size of mainly larger than 100 mesh (all mesh sizes are by U.S. Standard Sieves) is used adduction generally occurs in less than 15 minutes. When urea having a particle size of smaller than 200 mesh is used adduction generally occurs in less than 5 minutes. In any event the adduction reaction often occurs before the dispersion can be shaped into small particles.

The solid adduct itself has some slow release properties and has been disclosed and claimed in a copending application Serial No. 308,062, filed September 11, 1963, by R. H. Campbell and S. G. Belak, now abandoned. In fact, the adduct has a higher water resistance than a dispersion of solid urea in solid wax containing the same total amounts of urea and wax but in which the urea is in the unadducted form. The adduct has a disadvantage, however, in that its water resistance sometimes decreases rapidly after prolonged contact with water. This phenomenon is unpredictable in that some batches of adduct exhibit it while other batches, apparently identical, do not. Because of this erratic behavior it is often preferable that the slow release fertilizer be a dispersion of solid urea in solid paraffin wax rather than a urea-paraffin wax adduct. Where such is the case a method of preventing or at least postponing the adduction reaction is necessary in order that it does not occur during the time the dispersion is being processed into small particles. We have now found such a method.

According to the invention adduction of a urea-molten paraffin wax mixture is prevented, or at least substantially delayed, by incorporating, i.e., dissolving, a small amount of certain polyalkylaromatic hydrocarbons in the molten paraffin wax. Such incorporation permits the preparation of a stable dispersion of urea in molten paraffin wax. The dispersion is described as stable in that the urea and molten paraffin wax components do not react to form an adduct. The stable dispersion can be formed into fertilizer particles without difficulty in any convenient manner such as by the use of a mold as already described.

The polyalkylaromatic hydrocarbons suitable for the present purpose are described in more detail as follows:

They are described as hydrocarbons because they contain only carbon and hydrogen. They are aromatic hydrocarbons because they contain an aromatic nucleus, i.e., they contain the carbocyclic ring characteristic of benzene or the condensed carbocyclic ring system characteristic of naphthalene, anthracene, phenanthrene, etc. Preferably the aromatic nucleus is the condensed ring system of naphthalene, i.e., the naphthalene nucleus. As described hereinafter, the polyalkylaromatic hydrocarbons can contain more than 1 aromatic nucleus but it is essential that there be at least 1. The compounds are described as polyalkylaromatics because there is at least one aromatic nucleus containing at least 2 alkyl substituents. In other words, regardless of the number of aromatic nuclei in the compound there is at least one such nucleus which has attached to nuclear carbon atoms thereof at least 2 alkyl groups. Although 2 alkyl groups are sufficient for the present purposes, preferably there are at least 3, more preferably at least 4, alkyl groups. The maximum number of alkyl groups is limited by the particular aromatic nucleus but will usually not be more than 10, more frequently not more than 8. The position of the alkyl groups with respect to each other is not critical; they can be adjacent or nonadjacent. In the case of polycyclic aromatic nucleus such as in naphthalene the alkyl groups can be on the same or different rings. In addition, the alkyl groups can be same or different.

Each of the alkyl groups should contain at least 5 carbon atoms. Preferably each contains at least 8 carbon atoms. As a general rule the more carbon atoms in the alkyl groups, the more effective is the polyalkylaromatic as an adduct inhibitor. Usually each alkyl group will not contain more than 20 carbon atoms although alkyl groups having as many as 30 carbon atoms are suitable.

The effectiveness of the polyalkylaromatic as an adduct inhibitor is influenced to some extent by the particular carbon atom of each alkyl group which is attached to the aromatic nucleus. As stated above each alkyl group should contain at least five, preferably at least eight, carbon atoms. In addition, each alkyl group is preferably attached to the aromatic nucleus so as to maximize the number of carbon atoms in a straight chain, counting the carbon atom attached to the aromatic nucleus as one and counting therefrom to any end of the alkyl group. Preferably there are, by this counting procedure, at least 5, more preferably at least 8, carbon atoms in a straight chain. For example, if the aromatic nucleus is that of benzene and if the alkyl group attached thereto is n-octyl (ignoring the second alkyl group), then 1-octylbenzene is more desirable than 2-octylbenzene which in turn is more desirable than 3-octylbenzene, because by the above counting procedure the number of carbon atoms in a straight chain is eight, seven, and six, respectively.

The aromatic nucleus containing at least two alkyl substituents as described above can, if desired, contain other substituents which do not conform to the above description of the essential alkyl groups. As long as these other substituents are hydrocarbons they can be of any type, e.g., alkyl, aryl, alkenyl, cycloalkyl, alkaryl, aralkyl, etc. For example, dihexylmethylnapthalene and phenyldioctylbenzene are suitable for the present purpose. Preferably, the aromatic nucleus contains no substituents other than alkyl groups having at least 5 carbon atoms, but if any other substituents are present they are preferably alkyl groups.

From the above description it is apparent that the polyalkylaromatic hydrocarbons suitable for the present purpose can be defined as aromatic hydrocarbons having at least 2 alkyl groups attached to nuclear carbon atoms of one aromatic nucleus, said alkyl groups containing at least 5 carbon atoms.

Examples of polyalkylaromatic hydrocarbons which can be used to prevent adduction of urea and molten paraffin wax include dioctylbenzene, dioctylnaphthalene, trihexylbenzene, octylhexylnaphthalene, octyldiheptylbenzene, triheptyltoluene, heptylnonylxylene, didecyldioctylnaphthalene, trihexylanthracene, tetranonylmethylanthracene, phenyldioctylnaphthalene, dioctylvinylnaphthalene, etc.

Polyalkylaromatics as described above can be prepared by well known methods. For example, tri-n-octylbenzene can be prepared by a method based on the well known Grignard reaction. The procedure involves bromination of benzene to form monobromobenzene and treatment of the latter with magnesium to form phenylmagnesiumbromide. Reaction of the latter with 1-bromo-n-octane yields 1-phenyloctane (otherwise known as n-octylbenzene). Repetition of this procedure using the 1-phenyloctane as starting material yields di-n-octylbenzene. Another repetition of this procedure except using the di-n-octylbenzene as starting material yields tri-n-octylbenzene.

Another general method of preparing polyalkylaromatics involves reaction of an aromatic hydrocarbon with an alkyl acid sulfate. This method, which is described in copending application Serial No. 309,394, filed September 17, 1963, by Messrs. Ritter and Rubenstein, involves the initial preparation of an alkyl acid sulfate by the reaction of a 1-olefin such as hexene-1 with concentrated, i.e., 85–100%, sulfuric acid at −20° to 30° C., preferably 5°–10° C. The amount of $H_2SO_4$ is preferably 2–4 moles per mole of 1-olefin. The reaction involved is as follows:

$$CH_3CH_2CH_2CH_2CH=CH_2 + H_2SO_4 \longrightarrow$$

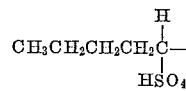

When the 1-olefin starting material contains more than about 5–6 carbon atoms the resulting alkyl acid sulfate is usually a heavy oil which is insoluble in the excess $H_2SO_4$ and it can be separated therefrom by decantation.

The 1-olefin starting material can be obtained by known methods, for example, by polymerization of ethylene or propylene, by cracking catalytic cycle petroleum oils, by the vapor phase cracking of paraffin wax followed by fractionation of the cracked product, etc.

As described in the aforesaid Ritter et al. application the 1-olefin starting material is preferably obtained by wax cracking. Such cracking, which is well known in the art, results in a crude olefin mixture which is predominantly 1-olefins containing 6–20 carbon atoms but which sometimes contains a small amount of internal olefins containing 6–20 carbon atoms. From this mixture a narrower olefin fraction having the desired number of carbon atoms, e.g., a $C_9$–$C_{11}$ fraction, can be separated by distillation. The narrower fraction, which is also predominantly 1-olefins, is preferably pretreated to remove any internal olefins therefrom before reacting the fraction with concentrated sulfuric acid to form alkyl acid sulfates. As described by Ritter et al. the pretreatment involves mixing the fraction with dilute (i.e., 60–80%) $H_2SO_4$ for 2–30 minutes, preferably 8–12 minutes. The dilute acid reacts with any internal olefins but is not strong enough to react with the 1-olefins. After the prescribed reaction time the acid phase is allowed to settle and the supernatant liquid, essentially pure 1-olefins, is drawn off and reacted with concentrated sulfuric acid in the manner described to form alkyl acid sulfates.

If it is not desired to separate a narrow fraction from the $C_{6-20}$ crude olefin mixture the crude mixture can itself be pretreated and then reacted with concentrated $H_2SO_4$ to form alkyl acid sulfates.

The alkyl acid sulfate is then reacted with an aromatic hydrocarbon such as naphthalene at a temperature of 0°–100° C. for a period of 0.5–8.0 hours. A typical reaction which occurs can be depicted as follows:

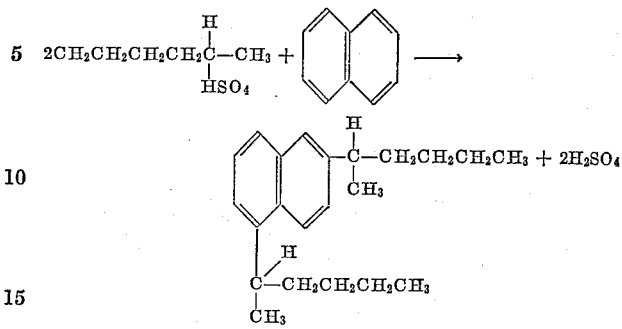

To obtain predominantly polyalkylnaphthalenes the molar ratio of the alkyl acid sulfate to naphthalene should be higher than 1:1, preferably the ratio is 2:1 to 5:1. The reaction product is a dark colored oil containing polyalkylnaphthalenes, a smaller amount of monoalkylnaphthalene, and acidic materials such as by-product sulfuric acid and excess alkyl acid sulfate. The reaction product is next dissolved in a solvent such as benzene and is tharoughly washed with NaOH to remove the acidic materials. The benzene solvent is then distilled off after which mono-, di-, and higher polyalkylnaphthalenes are then separated by distillation at, preferably, 0.1 m.m. Hg absolute pressure. If desired the second distillation step can be omitted and the mixture of polyalkylnaphthalenes, containing in some cases some monoalkylnaphthalene, used as is as the adduct inhibitor. Although monoalkylaromatics are not themselves effective as adduct inhibitors their presence with polyalkylaromatics does not detract from the effectiveness of the latter.

As described previously adduction of a mixture of urea and molten paraffin wax can be prevented by dissolving in the paraffin wax a polyalkylaromatic hydrocarbon of the type described above. It is recognized that in a substantially homogeneous mixture of molten paraffin wax and such a polyalkylaromatic, the latter may not be "dissolved" in the wax in the technical sense of the word. However, such a mixture has the appearance of a true solution and therefore is so referred to for the present purpose, i.e., in a substantially homogeneous mixture of molten paraffin wax and a polyalkylaromatic of the type described, the latter is referred to as dissolved in the wax.

The amount of polyalkylaromatic, hereinafter referred to as the inhibitor used, should, of course, be a stabilizing amount, i.e., the amount should be sufficient to prevent or at least substantially delay the adduction reaction. In most cases the dispersion of urea in wax will be processed into solid fertilizer particles, hence the adduction reaction should be delayed for the time required to effect such procesing. Whether the amount is sufficient is readily determined by observing whether a white precipitate forms. More specifically, the amount of inhibitor should normally be at least 0.5%, based on the weight of molten paraffin wax, preferably at least 1%, more preferably at least 3%. Preferably not more than 15% inhibitor, more preferably not more than 10% based on the weight of molten paraffin wax, is used since it is usually desirable to minimize the amount of non-fertilizer ingredients in the slow release fertilizer, although amounts of inhibitor as high as 25% or even as high as 40% can be used if desired. As previously stated the amount of wax and urea will usually be 15–49 parts and 5–80 parts respectively, more frequently 25–49 parts and 20–70 parts respectively.

The dissolution of the inhibitor in the molten paraffin wax and the subsequent addition of urea (and any other fertilizer ingredients as the case may be) can be effected in any convenient manner. Preferably, the paraffin wax is heated to about 200°–250° F. and the inhibitor is then added and the mixture stirred until the inhibitor dissolves in the wax. After the inhibitor has dissolved in the wax the mixture is preferably cooled to slightly above, e.g., 10°–20° F., the melting point of the wax before adding the urea to the solution. This is to eliminate any possibility of adduction. Since the adduction reaction occurs more readily at higher temperatures reducing the temperature aids in preventing adduction. Next the urea is charged and dispersed in the wax-inhibitor solution. If other fertilizer ingredients are to be included they are also added to the molten wax at this time. After dispersing the fertilizer ingredients in the wax-inhibitor solution the dispersion can be formed into discrete particles by any convenient means such as in a pellet mill, etc., after which the particles are cooled to obtain solid slow release fertilizer particles. As previously described the invention also embraces such slow release feritlizers, i.e., slow release fertilizers containing solid urea dispersed in solid paraffin wax, the paraffin wax having dissolved therein a polyalkylaromatic hydrocarbon having at least 2 alkyl groups attached to nuclear carbon atoms of one aromatic nucleus, said alkyl groups containing at least 5 carbon atoms.

An alternative but less preferable method of forming the dispersion is to charge the urea to the molten wax after which the inhibitor is then dissolved in the wax. This method is considerably less desirable since the urea may and frequently does react with the paraffin wax to form the adduct before the inhibitor can be dissolved in the wax. This problem is obviated by dissolving the inhibitor in the wax prior to the addition of urea.

The term paraffin wax is used throughout this specification in accordance with its conventional meaning. It is one of only two waxes obtainable from petroleum, the other being microcrystalline wax. The differences and similarities between these two kinds of wax are well known to those skilled in the art and are summarized in Bennett, Commercial Waxes, Chemical Publishing Co. (1950), pp. 84–88. Both paraffin and microcrystalline waxes contain mainly saturated paraffin hydrocarbons, the former containing mainly straight chain paraffins while the latter contains a substantial amount of branched chain paraffins. Some typical properties of paraffin and microcrystalline waxes are shown in Table I below.

TABLE I

| Property | Paraffin Wax | Microcrystalline Wax |
|---|---|---|
| Molecular Weight | 250–500 | 500–800 |
| Melting Point (ASTM D-127) °F | 110–165 | 140–210 |
| Viscosity at 210° F. (ASTM D-446) S.U.S | 30–50 | 60–100 |
| Penetration at 77° F. (ASTM D-1321—100 g., 5 sec.) dmm | 5–25 | 5–25 |

It is apparent from the data in Table I that some of the physical properties of the paraffin waxes overlap the normal range of the same property in the microcrystalline waxes. The property which can be used, as is well known, to distinguish paraffin wax from microcrystalline wax is the type of crystals present in each. Paraffin wax has large well-formed crystals while microcrystalline wax contains small irregular crystals and no well-formed crystals of any size. Indeed, microcrystalline wax is sometimes referred to as amorphous. The invention is preferably applicable to the dispersion of urea in a paraffin wax having melting point, viscosity, and penetration within the ranges stated in Table I above. All wax properties specified herein are by the appropriate tests indicated in the above table.

The following examples illustrate the benefits which can be obtained by the method of the invention.

*Example I*

40 parts of a paraffin wax having a melting point of 129° F., a penetration at 77° F. of 18 dmm., and a viscosity at 210° F. of 38 S.U.S. are charged to a mixing tank equipped with heating means. The wax is heated to 200° F. after which 60 parts of commercial crystal urea are added to the molten paraffin wax with stirring. After 1–2 minutes stirring the entire contents of the mixing tank have become a solid having about the texture of wet sand. The solid is analyzed and is found to contain a substantial amount of a urea-paraffin wax adduct, a small amount of wax, and essentially no free urea.

*Example II*

The procedure is the same as in Example I except that the amount of wax used is 38 parts and, in addition, prior to adding the urea 2 parts of di-n-octylnaphthalene are added to and dissolved in the molten paraffin wax. The di-n-octylnaphthalene is prepared by the Grignard procedure previously described, the only exception being that the starting material is naphthalene rather than benzene. The temperature of the wax-di-n-octylnaphthalene solution at the time urea is added thereto is 240° F. After the addition of urea the resulting slurry is stirred as in Example I. After stirring for 1 hour adduction of the urea has not occurred. The slurry remains fluid and can be shaped into fertilizer size particles by means of a mold, etc. After the 1 hour stirring period the experiment is ended.

*Example III*

A mixture of $C_{6-20}$ 1-olefins obtained by wax cracking is divided into three portions and each portion is fractioned to separate a specific narrow fraction. In this manner three fractions are obtained, a $C_{9-11}$ fraction, a $C_{11-15}$ fraction, and a $C_{15-20}$ fraction. Each fraction is pretreated with dilute $H_2SO_4$ in the manner described previously and is then reacted with concentrated $H_2SO_4$ as previously described. The resulting three alkyl acid sulfate fractions are then separately reacted with naphthalene in the manner described previously. The three quantities of alkylated naphthalene thus obtained are next separately distilled under vacuum to separate two fractions from each. One fraction is monoalkylnaphthalene while the other fraction is a mixture of di- and higher polyalkylnaphthalenes. In this manner the following 6 alkylated naphthalene fractions are obtained. The expression $C_{9-11}$, for example, means that the alkyl groups contain 9–11 carbon atoms.

| Monoalkyl-naphthalene | Mixture of Di- and Higher Alkylnaphthalenes |
|---|---|
| (a) $C_{9-11}$ | (a) $C_{9-11}$ |
| (b) $C_{11-15}$ | (b) $C_{11-15}$ |
| (c) $C_{15-20}$ | (c) $C_{15-20}$ |

Examples IV–IX show the effectiveness of these fractions in preventing adduction of a urea-molten paraffin wax mixture.

*Example IV*

The procedure is the same as in Example II except that 2 parts of $C_{9-11}$ monoalkylnaphthalene is used as the adduct inhibitor instead of di-n-octylnaphthalene. Adduction occurs, i.e., the contents of the mixing tank become solid in 1–2 minutes.

*Example V*

The procedure is the same as in Example IV except that 2 parts of $C_{11-15}$ monoalkylnaphthalene is used as the adduct inhibitor. Adduction occurs in 1–2 minutes.

Example VI

The procedure is the same as in Example IV except that 2 parts of $C_{15-20}$ monoalkylnaphthalene is used as the adduct inhibitor. Adduction occurs in 1–2 minutes. Examples IV–VI show, therefore, that an alkylaromatic must contain at least 2 alkyl groups to be effective as an adduct inhibitor. Example II shows, of course, that exactly 2 alkyl groups are sufficient.

Example VII

The procedure is the same as in Example II except that a mixture of $C_{9-11}$ di- and higher polyalkylnaphthalenes is used as the adduct inhibitor. After 1 hour adduction has not occurred.

Example VIII

The procedure is the same as in Example II except that a mixture of $C_{11-15}$ di- and higher polyalkylnaphthalenes is used as the adduct inhibitor. After 1 hour adduction has not occurred.

Example IX

The procedure is the same as in Example II except that a mixture of $C_{15-20}$ di- and higher polyalkylnaphthalenes is used as the adduct inhibitor. After 1 hour adduction has not occurred.

When other polyalkylaromatics of the type described herein are employed as adduct inhibitors similar results are obtained, i.e., adduction is prevented or at least substantially delayed.

The invention claimed is:

1. Method of forming a slow release fertilizer comprising a dispersion of solid urea in a solid paraffin wax which when in molten state normally reacts with solid urea to form an adduct which comprises (1) heating said paraffin wax to above its melting point whereby molten paraffin wax normally susceptible to adduction is obtained, (2) dissolving in the resulting molten paraffin wax an adduct inhibitor selected from the group consisting of aromatic hydrocarbons having at least two alkyl groups attached to nuclear carbons of one aromatic nucleus, said alkyl groups containing at least 5 carbon atoms, the amount of said adduct inhibitor being 0.5–40% by weight of said molten paraffin wax, (3) dispersing solid urea in the molten paraffin wax containing said adduct inhibitor, and (4) cooling the resulting dispersion to below the melting point of the wax whereby a slow release fertilizer comprising a dispersion of solid urea in solid paraffin wax is obtained.

2. Method according to claim 1 wherein said aromatic nucleus is the naphthalene nucleus.

3. Method according to claim 2 wherein the number of said alkyl groups is at least 3.

4. Method according to claim 1 wherein said alkyl groups each contain at least 8 carbon atoms.

5. Method according to claim 1 wherein the amount of said solid urea is 5–80 parts and the amount of said molten paraffin wax is 15–49 parts.

6. Method according to claim 1 wherein each of said alkyl groups contains at least 5 carbon atoms in a straight chain, counting the carbon atom attached to said aromatic nucleus as 1 and counting therefrom to any end of said alkyl group.

References Cited by the Examiner

UNITED STATES PATENTS

| | | | |
|---|---|---|---|
| 2,936,226 | 5/60 | Kaufman et al. | 117—100 |
| 2,944,918 | 7/60 | Nagel et al. | 117—168 |
| 3,014,783 | 12/61 | Young | 117—100 |
| 3,034,858 | 5/62 | Vives | 71—64 |
| 3,096,171 | 7/63 | Woerther | 71—64 |

DONALL H. SYLVESTER, *Primary Examiner.*

ANTHONY SCIAMANNA, *Examiner.*